United States Patent [19]
Gaul et al.

[11] 3,969,034
[45] July 13, 1976

[54] WEDGE LOCK WHEEL ASSEMBLY

[75] Inventors: Edward M. Gaul, Naperville; Aldo Allori, Brookfield; Thomas Hillstrom, Downers Grove, all of Ill.

[73] Assignee: International Harvester Company, Chicago, Ill.

[22] Filed: Apr. 18, 1975

[21] Appl. No.: 569,510

Related U.S. Application Data

[63] Substitute for Ser. No. 457,046, April 1, 1974, abandoned.

[52] U.S. Cl. .............................. 403/357; 403/104; 403/370; 301/1
[51] Int. Cl.² ...................... F16D 1/08; B60B 37/04
[58] Field of Search .......... 403/356, 357, 358, 359, 403/368, 369, 370, 372, 374, 104; 301/1, 111

[56] References Cited
UNITED STATES PATENTS

| | | | |
|---|---|---|---|
| 3,279,831 | 10/1966 | Smelcer et al. | 301/1 X |
| 3,404,908 | 10/1968 | Palmer | 301/1 X |
| 3,817,580 | 6/1974 | Wilson | 301/1 |

*Primary Examiner*—Andrew V. Kundrat
*Attorney, Agent, or Firm*—William H. Wendell; Floyd B. Harman

[57] ABSTRACT

A wedge lock wheel assembly for mounting a tire rim in which the assembly includes a hub rigidly attached to the rim having a chamber with a centerline substantially perpendicular to the disk, a plurality of stops and a plurality of pairs of paired ramps with a known hardness having complex angles relative to the disks, a plurality of sets of paired wedges positioned within the chamber capable of relative motion therebetween and having an aperture passing through each of said pairs, a generally flat and bottom surface, a slope top surface and a hardness greater than the hardness of the ramps, a plurality of restraining members for limiting the motion between sets of said wedge pairs, an axle having horizontal contact surfaces with a hardness greater than the hardness of the wedges and a plurality of connecting elements passing through said wedge apertures for establishing contact between said ramps and said slope surfaces and between said bottom surfaces and said contact surfaces.

6 Claims, 5 Drawing Figures

WEDGE LOCK WHEEL ASSEMBLY

CROSS REFERENCES TO RELATED APPLICATIONS

This is a substitute application of our application Ser. No. 457,046, filed Apr. 1, 1974, now abandoned.

BACKGROUND OF THE INVENTION

This invention relates generally to devices used to adjustably secure tractor wheels to the tractor axle and, more particularly, concerns wedge lock assemblies which are slidably adjustable axially in their unlocked condition.

In today's agricultural industry the tractors used must perform a wide variety of operations, each of which require a particular separation between the drive wheels of the tractor. The existing configurations which attempt to adjustably secure the tractor wheel to the axle include the use of wedge arrangements to provide the desired locking effect. Although these configurations produce an adjustably secured wheel assembly, they suffer from several problems which our invention overcomes with its nonobvious and novel combination of elements.

One of the difficulties with the existing wedge arrangements lies in the magnitude of the release torque required to unlock the wheels after they have been in use. This torque must be kept at a level that permits changing the wheel spacing in the field as well as in maintenance areas. When the existing arrangements have been locked and have transmitted force to the wheels, the wedges and hubs become fused together through the process of cold welding which is the plastic deformation of materials due to excessive loading. As a result of this fusing the unlocking torque required for the existing arrangements becomes unacceptably high.

The second difficulty arising from the existing arrangements also relates to the unlocking torque required after use in the field which distorts the shape of the hub. The distortion is caused by the arrangement's hub material being softer than the wedge material thereby producing controlled elastic deformation during the extended periods of force transmission. This deformation increases the unlocked torque required since the wedges were designed to engage a spherical hub and upon removal they are engaged with an eliptical hub.

The third difficulty with the existing wedge arrangements manifests itself in the failure of the arrangement caused by erosion of the wedge elements. The erosion occurs during the transmission of forces from the tractor axle to the tractor wheel when the non-transmitting wedges lose contact with the axle and when the table leg geometry of the wedges leaves the short leg free. This lack of contact permits the wedges to vibrate and contact the hub and axle under impact loading conditions which erode the wedge at a variety of locations. The arrangement loses its lockability when the erosion interferes with the mating of the elements of the arrangement.

Accordingly, it is the primary aim of the invention to provide a wedge lock wheel assembly which is capable of varying the tractor wheel tread separation within both the maintenance areas and in the field while minimizing the costs and complexity of the assembly.

Moreover, it is object of the invention to provide a wedge lock assembly that has a positive disengaging of the assembly without adversely effecting the torque necessary for disengagement.

With more particularity, it is an object of the invention to provide a wedge lock assembly of the stated character that also minimizes the jamming effect of the wheel hub distortion without decreasing the position control or the forced transmission capabilities of the assembly.

Finally, it is an object of the invention to provide a wedge lock wheel assembly that transmits force without producing cold welding or erosion of the locking elements.

SUMMARY OF THE INVENTION

In accordance with the invention there is provided a wedge lock wheel assembly for mounting a tire rim having a vertical center disk. The assembly includes a hub rigidly attached to said rim having a chamber with a centerline substantially perpendicular to said disk and including a plurality of stops and a plurality of pairs of paired ramps which have a known hardness and have complex angles relative to said disk. The assembly further includes a plurality of pairs of paired wedges which are capable of relative motion therebetween and positioned within said chamber, and have an aperture passing through each of said pairs, a generally flat bottom surface, a slope top surface and a hardness greater than the hardness of said ramps. The final elements of the wedge lock wheel assembly are a plurality of restraining means for limiting the motion between pairs of said wedge pairs, an axle having horizontal contact surfaces with a hardness greater than said wedge hardness and a plurality of connecting means passing through said wedge apertures for establishing contact between said ramps and said slope surfaces, and between said bottom surfaces and said contact surfaces.

BRIEF DESCRIPTION OF THE DRAWINGS

Other objects and advantages of the invention will become apparent upon reading the following detailed description and upon reference to the drawings in which.

while the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention solves the unlocking torque and erosion problems of the prior wedge lock arrangements by providing lock configuration in which the wedges experience elastic deformation during force transmission.

Figure 1:
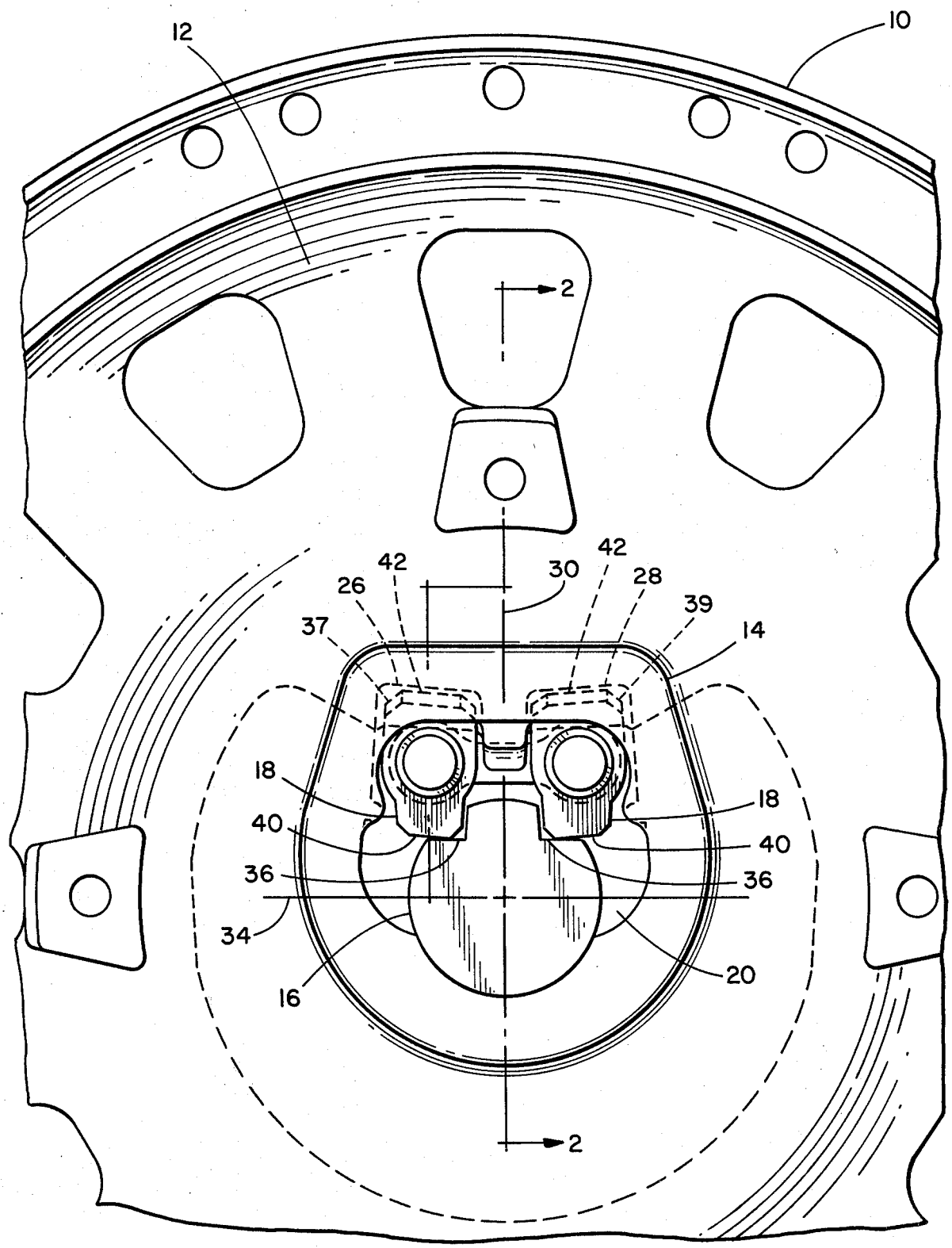
FIG. 1 is a side view of the wedge lock wheel assembly.

Turning first to FIG. 1 there is depicted a tractor rim 10 having a vertical disk 12 rigidly attached to a hub 14. The tractor axle 16 supplies the motor force to the rim 10 through their mutual contact with the wedges 18.

Figure 2:
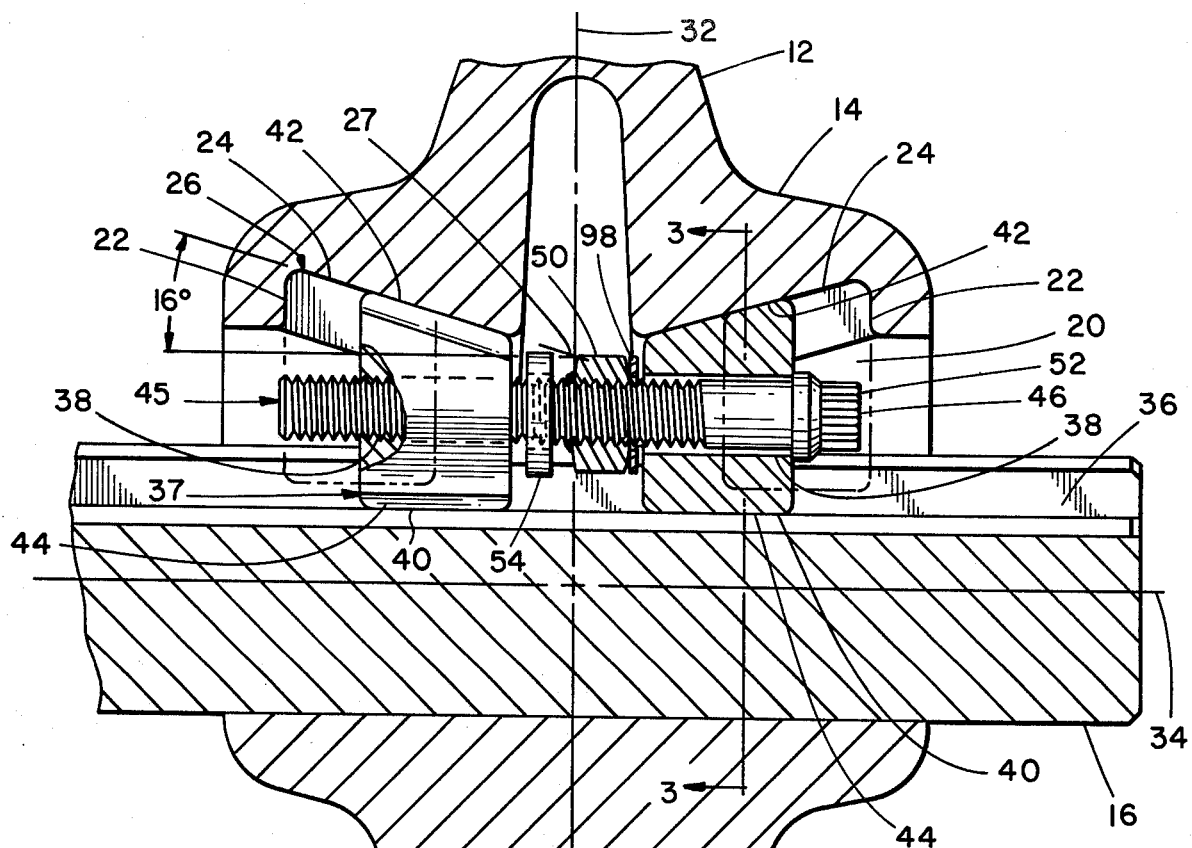
FIG. 2 is a section view of the wedge lock wheel assembly, along line 2—2 of FIG. 1.
Figure 3:
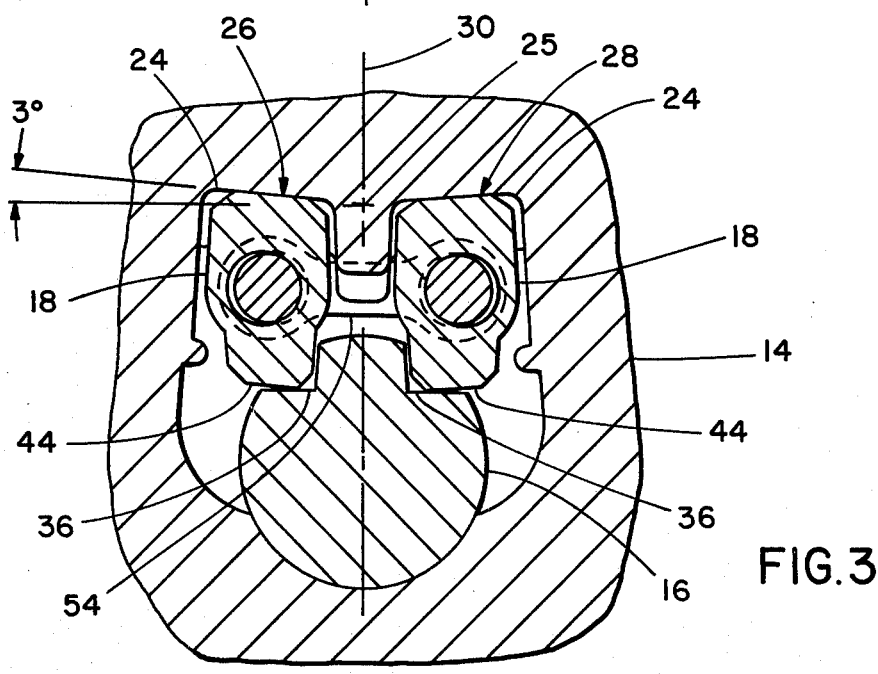
FIG. 3 is a section view of the wedge lock wheel assembly in the loose condition, along line 3—3 of FIG. 2.

In the preferred embodiment, the hub 14 includes a chamber 20 which has a plurality of stops 22 and ramps 24 having complex angles with respect to the rim disk 12, see FIGS. 2 and 3. In the present instance the ramps 24 form two sets of paired ramps 26 and 28 which have symmetrical complex angles with respect to the verticle disk 12. These complex angles can be best understood by reference to FIGS. 2 and 3 where the preferred embodiments 3 degree and 16 sixteen degree angles are geometrically shown.

As best shown in FIG. 3, the 3 degree angle of the ramps 24 is generated from a common point 25 on the vertical center line 30 of the chamber 20. When consideration is given to the three dimensional nature of the ramp, this common generation point is transformed into a common generation line which lies in the vertical plane which symmetrically divides the chamber 20. Turning now to FIG. 2, the 16 degree angle of the ramps 24 is shown to be generated from a common point 27 between the ramps of the paired ramps in a given set of ramps 26. This common generation point 27 lies in a line 32 which is perpendicular to the horizontal axis 34 of the chamber 20. The extrapolation of the generation point to define the face of the ramps 26, also produces a common generation line for the 16° angle with the line lying in a plane perpendicular to the chamber axis 32.

In carrying out the invention the above-described chamber 20 combines with the axle 16 to form the volume in which the wedges 18 are contained. In the illustrated form the axle 16 is of the normal cylindrical configuration except it contains horizontal contact surfaces 36 which engage the wedges 18. While the illustrated construction utilizes ramps 24 and horizontal contact surfaces 36 which are planes it will be apparent to those skilled in the art that alternatives which provide substantially flat contact surfaces for both the ramps and the axle contact surfaces will be equally functional.

In keeping with the invention the wedges of the preferred embodiment are positioned within the volume defined by the chamber 20 and the axle 16. The preferred wedges have apertures 38 for operatively connecting the wedges to each other, have flat bottom surfaces 44 contacting the horizontal contact surfaces 36 of the axle 16 and have sloped top surfaces 42 for engaging the ramps 24 of the hub 14. As is best shown in FIG. 2 the sloped top surface 42 of the wedge 18 is at a 16 degree angle with respect to the flat bottom surface. As also shown in FIG. 2, each set 37 and 39 of wedges 18 is operatively connected by a connecting means 45. In the illustrated form the connecting means 45 includes a bolt 46 a spacer 98 and a nut 50 with the nut being permanently affixed, e.g. welded, to the bolt after one wedge and the spacer have been positioned between the nut and the head 52 of the bolt 46. Pursuant to the invention the sets 37 and 39 of wedges 18 are limited in the relative motion therebetween by restraining means 54 which consists of a plate having apertures capable of accepting the bolts 46. preassembled In the practice of the present invention the sets of wedges 37 and 39 are preassemblied and placed within the chamber of hub 14. The hub and wedge arrangement is then placed upon the axle 16 with the slope top surface 42 of the wedges engaging the ramps 24 of the chamber and with the flat bottom surface 40 of the wedges engaging the horizontal contact surface 36 of the axle. When the proper axial displacement of the hub on the axle has been established, the wedges are moved from their free position near the stops 22, shown in phantom in FIG. 2, to their contact position, shown in solid in FIG. 2, by rotating the bolt 46 within the wedge apertures 38.

Figure 4:
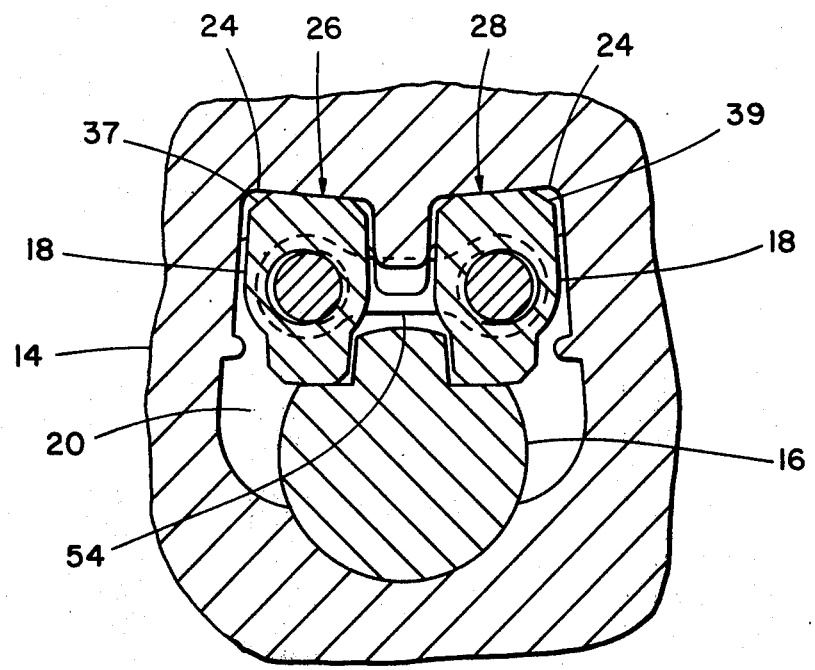
FIG. 4 is a section view similar to FIG. 3 with the wedge lock wheel assembly in the lock condition.
Figure 5:
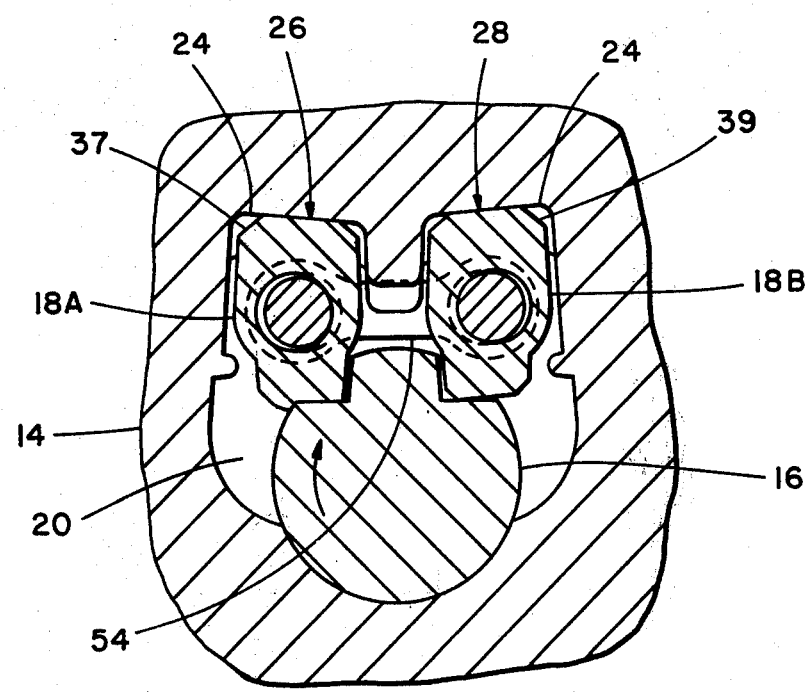
FIG. 5 is a section view of the wedge lock wheel assembly similar to FIGS. 3 and 4 with the assembly in a force transmitting condition.

The orientation of the elements of the wedge lock wheel assembly in this initial contact or loose condition is depicted in FIG. 3 which shows a point contact between the wedges and the axle, and a planar contact between the wedges and the hub. The planar and point contact results from the geometry of the elements responding to the urgings of gravity and minimizing the vertical distance between the axle 16 and the hub 14. Although it is possible to transmit force with a wedge lock wheel assembly this condition, in order to resolve the difficulties noted above, the bolt 46 must be further rotated to obtain the locked orientation depicted in FIG. 4.

In the locked condition the wedges have been forced into a closer relative position axially and have experienced elastic deformation in their contact with the axle thereby converting the contact from a point to a planar contact. In the illustrated form the respective hardness ranges for the ramps 24, the wedges 18, and the horizontal contact surfaces 36 when measured on a Rockwell C hardness scale is 6 to 20, 30 to 37, and 47 to 55. These relative hardnesses combined with the high surface stresses characteristic of a point contact produce the deformation of the wedges at their point of contact with the harder axles.

The deformation of the wedges is again modified when the wedge lock wheel assembly is transmitting force from the axial to the hub. Under these force transmitting conditions, as shown in the clockwise rotational force transmission of FIG. 3, the onside wedge 18A is further deformed in its contact with the axle 16 while the offside wedge 18B assumes a configuration which more closely resembles that of the loose orientation of FIG. 3. This force transmitting deformation of the onside wedge 18A also results from a combination of the relative hardnesses of the elements and the differences in the surface stresses of the contact surfaces caused by the differences in the contact areas. While the shape of the offside wedge 18B was analogized to the loose wedge shape of FIG. 3, it must be understood that the offside wedge 18B does not lose contact with the axle or the hub since the deformation force of its locked condition is not exceeded by the separating forces acting on it during force transmission. It will be apparent that when the force transmission is terminated the residual forces causing the elastic deformation of the onside wedge will be transmitted through the hub to the offside wedge and the wedge lock wheel assembly will assume the locked condition orientation of FIG. 4.

From the foregoing it will be seen that a wedge lock wheel assembly of the present invention provides a means for adjustably securing a rim to an axle which has its unlocking torque unaffected by the distortion of the hubs since the wedges elastically deform, which incorporates a positive disengagement by the inner action of the hub stops and the wedges when the connecting means are loosened, which eliminates the problem of erosion and coldwelding by controlling the hardnesses, the geometry and the contact surfaces of the elements of a wedge lock wheel assembly, and provides a wedge lock wheel assembly which is capable of varying the tractor wheel tread separation either in a maintenance area or in the field while minimizing the cost and complexity of the assembly.

Thus it is apparent that there has been provided in accordance with the invention, a wedge lock wheel assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A wedge lock wheel assembly for mounting a tire rim having a vertical center disc, the assembly comprising:
   a hub rigidly attached to said rim having chamber with a centerline substantially perpendicular to said disc, said chamber comprising;
   a plurality of stops;
   a plurality of sets of paired ramps with a known hardness having complex angles relative to said disc;
   at least two sets of paired wedges positioned within said chamber, capable of relative motion therebetween, and having an aperture passing through each of said pairs, a generally flat bottom surface, a sloped top surface and a hardness greater than said ramps's hardness;
   a plurality of restraining means for limiting the motion between said sets of said wedge pairs;
   an axle having horizontal contact surfaces with a hardness greater than said wedge hardness; and
   a plurality of connecting means passing through said wedge apertures for establishing contact between said ramps and said sloped surfaces, and between said bottom surfaces and said contact surfaces.

2. The wedge lock wheel assembly of claim 1 wherein said ramp hardness has Rockwell C hardness range of 6 to 20, said wedge hardness has a Rockwell C hardness range of 30 to 37 and said contact surface hardness has a Rockwell C hardness range of 47 to 55.

3. The wedge lock wheel assembly of claim 2 wherein said complex angles are above a horizontal plane containing said chamber centerline, and are substantially 3° with a common generation line between said sets of ramp pairs in a plane containing said vertical chamber centerline and substantially 16° with a common generation line between said pairs of ramps in a plane perpendicular to said horizontal chamber centerline.

4. The wedge lock wheel assembly of claim 3 wherein said hub, said wedge and said axle are gray iron.

5. The wedge lock wheel assembly of claim 1 wherein said complex angles are above a horizontal plane containing said chamber centerline, and are substantially 3° with a common generation line between said sets of ramp pairs in a plane containing said chamber centerline and substantially 16° with a common generation line between said pairs of ramps in a plane perpendicular to said chamber centerline.

6. The wedge lock wheel assembly of claim 5 wherein said hub, said wedge and said axle are gray iron.

* * * * *